UNITED STATES PATENT OFFICE.

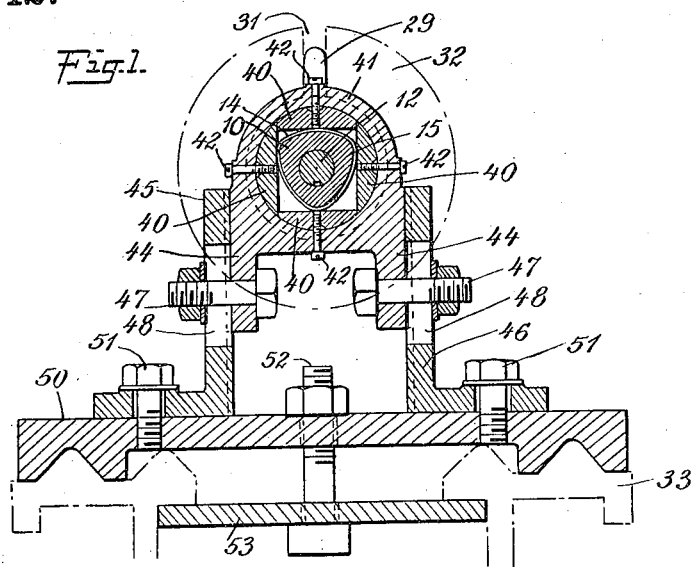
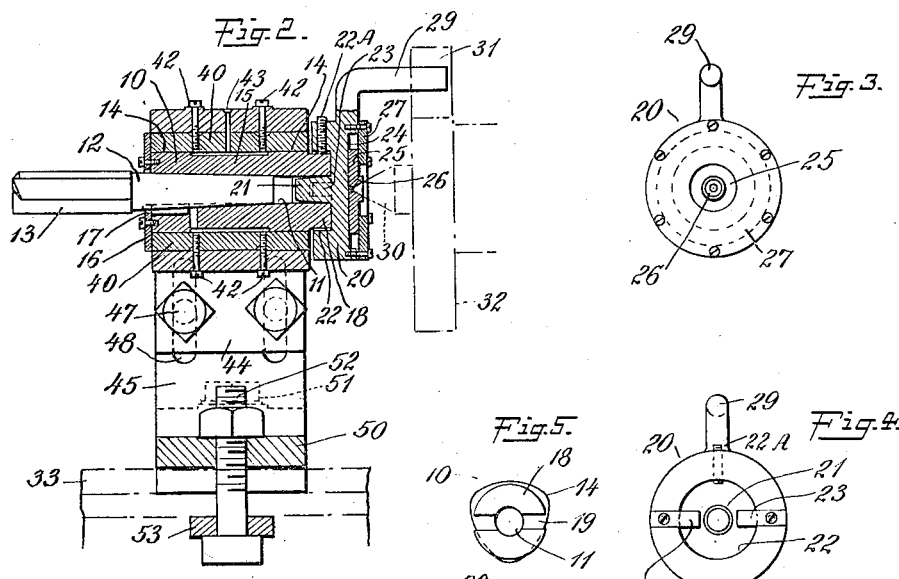
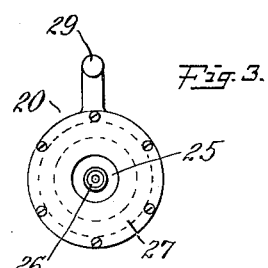
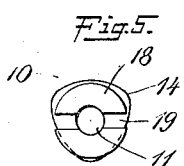
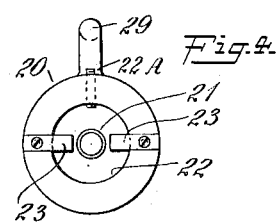
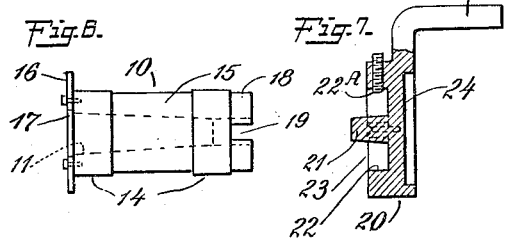
G. E. OTIS.
POLYGONAL HOLE DRILL.
APPLICATION FILED NOV. 2, 1917.
1,289,242.
Patented Dec. 31, 1918.
INVENTOR
Gerald E. Otis
BY
Marshall O. Dearborn
ATTORNEYS

GERALD E. OTIS, OF BUFFALO, NEW YORK, ASSIGNOR OF ONE-HALF TO WALTER J. TOWERS, OF TOLEDO, OHIO.

POLYGONAL-HOLE DRILL.

1,289,242.

Specification of Letters Patent.

Patented Dec. 31, 1918.

Application filed November 2, 1917. Serial No. 199,882.

*To all whom it may concern:*

Be it known that I, GERALD E. OTIS, a citizen of the United States of America, and a resident of Buffalo, Erie county, and State of New York, have invented certain new and useful Improvements in Polygonal - Hole Drills, of which the following is a specification, reference being had to the accompanying drawings, forming a part thereof.

My invention relates to polygonal hole drills and its objects are to provide a simple and rigid mechanism capable of withstanding the strains to which it is subjected in use, to simplify the construction and arrangement of parts, and to make a device which may be easily and quickly adjusted.

In order that my invention may be thoroughly understood, I will now proceed to describe the same in the following specification and then point out the novel features thereof in appended claims.

Referring to the drawings:

Figure 1 is a sectional front elevation of a square hole drill mechanism made according to and embodying my invention with the face plate and bed rails of a lathe indicated by broken lines.

Fig. 2 is a central longitudinal section of the apparatus shown in Fig. 1.

Fig. 3 is a rear end elevation of a socket head which is a part of the particular apparatus illustrated in the preceding figures.

Fig. 4 is a front end elevation of the socket head.

Fig. 5 is a rear end elevation of the peculiar drill socket which forms a part of this novel mechanism.

Fig. 6 is a side elevation of the drill socket.

Fig. 7 is a side elevation partly in section of the socket head.

Like characters of reference designate corresponding parts in all the figures.

10 designates a drill socket which is provided with a tapered bore 11 into which fits the similarly tapered shank 12 of a drill 13 keyed thereto to prevent it from turning in the socket. The end portions of this socket member are raised and made cam-shaped in accordance with the plan disclosed in my allowed application for patent Serial No. 142,882 filed January 17, 1917. These spaced external cam portions are designated on the drawings by the reference numeral 14. The body portion 15 between them is therefore somewhat depressed and may be cylindrical in cross-section as shown. 16 is a circular end plate affixed to the forward end of the drill socket as by screws. The radius of this end plate is greater than that of the greatest radius of the cam portions 14 and it is provided with a central clearance hole 17 for the drill shank 12. The rear end 18 of the socket member is cylindrical, and 19 is a transverse slot cut centrally across this rear end of the drill socket.

20 is a socket head having a central tapered boss 21 adapted to enter the rear end of the bore 11 and to fit the same when fully inserted, the taper being provided for the purpose of facilitating its insertion. This head also has an annular shoulder 22 which fits over the cylindrical rear end 18 of the socket. A set screw 22^A through this part of the head secures it to the socket. 23 are keys which fit into the slot 19 and form a non-rotative connection between the socket and the socket head. The rear end of the socket head is recessed as shown and has a smooth surface 24 over which slides a thrust plate 25 of smaller diameter than that of the recess. This is provided with a central depression 26 for the reception of the head center 30 of a lathe or other desired machine tool. 27 is a retainer plate screwed onto the back of the socket head to hold the thrust plate without interfering with its lateral movement. An arm 29 offset from the center of the socket head, projects rearwardly therefrom a sufficient distance to enter a slot 31 in the face plate 32 of the lathe, by means of which the socket head, the socket, and the drill may be rotated.

The socket is surrounded by a cam guide, in this case of square cross-section, built up of four cam guide members 40 inserted within a cylindrical bore in a housing 41 and held therein by screws 42. This cam guide and the method of its construction are more specifically described in another application for patent filed herewith and given Serial No. 199,883. The cam surfaces 14 engage this cam guide. 43 is an oil hole through the housing leading to the part of the cam guide between the cams 14.

The housing is constructed with parallel sides 44 which fit between brackets 45—46 to which the housing is adjustably secured by bolts 47 passing through slots 48 in the brackets. The brackets 45—46 are secured to a base 50 which fits the bed rails 33 of the lathe, by bolts 51, and the base is clamped to the lathe bed by bolts 52 and a clamping plate 53.

It may be seen that this device is constructed of but few parts, all of considerable strength and rigidity and that it may be easily and quickly set up on a lathe, for example. It is not necessary that the center of the cam guide coincides with the center of the lathe exactly, as it is only necessary to so adjust the parts that the axis of the drill be held parallel with the axis of rotation and the construction of the parts is such that this required parallelism is easily attained.

The operation of the cam in so moving the drill that it will cut square holes is well understood and this specification is not encumbered with a description of it.

It is a fact however that the lateral movement of the drill has a tendency to produce lost motion, and that no lost motion is permissible between the cams and the cam guide. This is because any looseness between these parts produces a chatter which not only prevents accurate work but which if present, soon increases and causes a device of this character to hammer itself to pieces. Such devices as have been available heretofore have not been able to stand up in shop practice because of this defect and because of the complexity of their construction.

This device is not only capable of withstanding the wear and tear of shop work even for drilling large size holes in hard metals, but the drills are readily replaced without dismantling the apparatus. Holes of different sizes may be drilled with the same device by merely substituting drill sockets with cams of different proportions.

While I have described the invention by showing an apparatus designed to be applied to a lathe and to drill square holes, it is well within its scope to so construct the parts that they may be applied to other machines such as drill presses and milling machines, and to form the cam and cam guides to cause polygonal holes other than squares, to be drilled.

What I claim is:

1. A rotary drill socket having its outer surface constructed to form a cam, a drill connected with said socket, means for loosely connecting said socket with the face plate of a machine tool whereby said socket may be rotated thereby without restraining its lateral movement, a cam guide surrounding the socket and arranged to hold the axis of the drill parallel with the axis of rotation, and means for preventing longitudinal movement of the socket.

2. A rotary drill socket having its outer surface constructed to form a cam, a drill connected with said socket, a socket head, a driving arm projecting therefrom offset from the axis of the drill, a slidable thrust plate on said socket head, and a cam guide surrounding the socket and arranged to hold the axis of the drill parallel with the axis of rotation.

3. A rotary socket having its outer surface constructed to form a cam, a drill connected with said socket, a removable socket head, a non-rotative connection between the socket and said head, a driving arm projecting from said head offset from the axis of the drill, a slidable thrust plate on said socket head, and a cam guide surrounding the socket and arranged to hold the axis of the drill parallel with the axis of rotation.

4. A rotary drill socket having its outer surface constructed to form a cam, a drill connected with said socket, a socket head, a driving arm projecting therefrom offset from the axis of the drill and arranged to be driven by the face plate of a machine tool, a slidable thrust plate on the socket head provided with a depression for the reception of the head center of the machine tool, a cam guide surrounding the socket and arranged to hold the axis of the drill parallel with the axis of rotation of the machine tool, and adjustable means for securing the cam guide to a stationary part of a machine tool.

5. A rotary drill socket having its outer surface constructed to form a cam, a drill connected with said socket, a driving arm connected with the socket and projecting therefrom in a position offset from the axis of the drill, and a cam guide surrounding the socket and arranged to hold the axis of the drill parallel with the axis of rotation.

6. A rotary drill socket having its outer surface constructed to form like raised cam surfaces spaced apart, a drill connected with said socket, a driving arm connected with the socket and projecting therefrom in a position offset from the axis of the drill, and a cam guide surrounding the socket and arranged to engage said cam surfaces to hold the axis of the drill parallel with the axis of rotation.

7. A rotary drill socket having its outer surface constructed to form a cam, a drill having a shank fitting said socket, a driving arm connected with the socket and projecting therefrom in a position offset from the axis of the drill, a cam guide surrounding the socket and arranged to hold the axis of the drill parallel with the axis of rotation, and means for preventing longitudinal movement of the socket.

In witness whereof, I have hereunto set my hand this 1 day of November, 1917.

GERALD E. OTIS.